United States Patent Office 3,657,234
Patented Apr. 18, 1972

---

3,657,234
O-(BENZO - 1,2,4 - TRIAZIN - 3-YL)-PHOSPHORIC, PHOSPHONIC, THIONOPHOSPHORIC AND THIONOPHOSPHONIC ACID ESTERS
Karl-Julius Schmidt, Wuppertal-Vohwinkel, and Ingeborg Hammann, Cologne, Germany, assignors to Farbenfabriken Bayer Aktiengesellschaft, Leverkusen, Germany
No Drawing. Filed Oct. 8, 1969, Ser. No. 864,864
Claims priority, application Germany, Oct. 23, 1968,
P 18 04 526.6
Int. Cl. C07d 55/10
U.S. Cl. 260—248 AS         10 Claims

ABSTRACT OF THE DISCLOSURE

O - (benzo-1,2,4-triazin-3-yl) - phosphoric, phosphonic, thionophosphoric and thionophosphonic acid esters, i.e. (alkyl, phenyl and O-alkyl)-O-alkyl-O-(mono and di chloro, alkyl and/or alkoxy - substituted benzo-1,2,4-triazin-3-yl)-phosphoric, phosphonic, thionophosphoric and thionophosphonic acid esters, which possess arthropodicidal, especially acaricidal and insecticidal, properties, and which may be produced by conventional methods.

---

The present invention relates to and has for its objects the provision for particular new O-(benzo - 1,2,4 - triazin-3-yl)-phosphoric, phosphonic, thionophosphoric and thionophosphonic acid esters, i.e. (alkyl, phenyl and O-alkyl)-O-alkyl-O-(mono and di chloro, alkyl and/or alkoxy-substituted benzo - 1,2,4 - triazin-3-yl)-phosphoric, phosphonic, thionophosphoric and thionophosphonic acid esters, which possess arthropodicidal, especially insecticidal and acaricidal, properties, active compositions in the form of mixtures of such compounds with solid and liquid dispersible carrier vehicles, and methods for producing such compounds and for using such compounds in a new way, especially for combating pests, e.g. arthropods, with other and further objects becoming apparent from a study of the within specification and accompanying examples.

In German Pat. 1,115,738, there are described open-chain and cyclic quinoxalino - 2,3 - thiophosphoric acid esters, whilst in Belgian Pat. 702,672 there are described (thiono-) phosphoric and phosphonic acid esters of nuclearly substituted 2-hydroxy-quinoxalines such as O,O - dimethyl - O - (6 - methyl - quinoxalin - 3 - yl)-thionophosphoric acid ester, i.e. O,O-dimethyl-O-(6-methyl-benzo - 1,4 - diazin-3-yl)-thiono-phosphoric acid ester (A), O,O - diethyl - O - (6 - chloro - quinoxalin - 3 - yl)-thionophosphoric acid ester, i.e. O,O-diethyl-O-(6-chloro-benzo-1,4-diazin-3-yl)-thiono-phosphoric acid ester (B), Phenyl-O-ethyl-O-(5,7- or 6,8 - dimethyl-quinoxalin-3-yl)-thionophosphonic acid ester, i.e. phenyl - O - ethyl-O-(5,7- or 6,8-dimethyl-benzo-1,4-diazin-3-yl)-thiono-phosphonic acid ester (C), ethyl-O-ethyl-O-(6- or 7-methyl-quinoxalin-3-yl)-thiono-phosphonic acid ester i.e. ethyl-O - ethyl - O - (6 - or 7 - methyl - benzo - 1,4 - diazin-3-yl)thionophosphonic acid ester (D), O,O-diethyl-O-(5,7- or 6,8 - dimethyl-quinoxalin-3-yl)-thiono-phosphoric acid ester, i.e O,O-diethyl-O-(5,7- or 6,8-dimethyl-benzo-1,4-diazin-3-yl)-thiono-phosphoric acid ester (E), and Ethyl-O-ethyl-O-(5,7- or 6,8-dimethyl-quinoxalin-3-yl)-thionophosphonic acid ester, i.e. ethyl-O-ethyl-O-(5,7- or 6,8-dimethylbenzo-1,4-diazin-3-yl) - thiono - phosphonic acid ester (F).

Such known compounds possess only two nitrogen atoms in the corresponding heterocyclic ring. However, these known compounds exhibit the disadvantage that they are not very effective against resistant spider mites, or their industrial production presents difficulties.

It has now been found, in accordance with the present invention, that the particular new phosphorus acid esters, i.e. O-(benzo-1,2,4-triazin-3-yl)-phosphoric, phosphonic, thionophosphoric and thionophosphonic acid esters of the formula

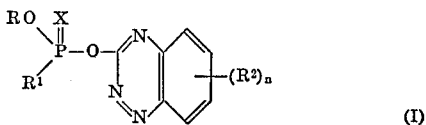

(I)

in which

R is alkyl of 1–4 carbon atoms,
R¹ is alkyl of 1–4 carbon atoms, alkoxy of 1–4 carbon atoms or phenyl,
X is oxygen or sulfur,
R² is chloro, alkyl of 1–4 carbon atoms or alkoxy of 1–4 carbon atoms, and
n is a whole number from 1 to 2, exhibit strong arthropodicidal, especially insecticidal and acaricidal, properties.

It has been furthermore found, in accordance with the present invention, that the particular new compounds of Formula I above may be produced by a process which comprises reacting a 3-hydroxy-benzo-1,2,4-triazine of the formula

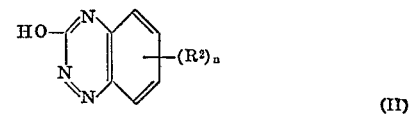

(II)

in which R² and n are the same as defined above, with a phosphoric, phosphonic, thionophosphoric or thionophosphonic acid ester halide of the formula

(III)

in which

R, R¹ and X are the same as defined above, and
Hal is a halogen atom such as chloro, bromo, iodo or fluoro, especially chloro or bromo.

Advantageously, the particular new compounds of Formula I above are distinguished by outstanding insecticidal and acaricidal properties, including excellent activity against biting and sucking insects, ticks and resistant spider mites, as well as, in most cases, extremely low toxicity to warm-blooded animals and concomitantly low phytotoxicity. It is decidedly surprising that the compounds according to the present invention are in these respects superior to the above-mentioned comparable known compounds of analogous constitution and the same type of activity. The compounds of the present invention therefore represent a valuable enrichment of the art.

The production process according to the present invention is illustrated by the following reaction scheme:

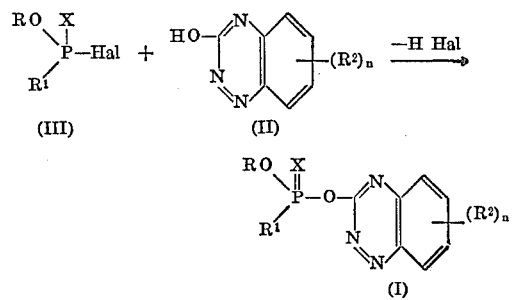

The starting materials to be used for producing the instant new compounds are clearly characterized by the Formulae II and III above. They can be produced in known manner from the corresponding nuclear-substituted O-nitrophenyl ureas by ring closure in an alkaline medium and subsequent reaction with reducing agents like zinc powder, stannous chloride, phosphorus trichloride etc.

Advantageously, in accordance with the present invention, in the various formulae herein:

R represents straight and branched chain lower alkyl hydrocarbon of 1–4 carbon atoms such as methyl, ethyl, n- and iso-propyl, n-, iso-, sec.- and tert.-butyl, and the like, especially $C_{1-3}$ or $C_{1-2}$ alkyl;

$R^1$ represents straight and branched chain lower alkyl hydrocarbon of 1–4 carbon atoms such as methyl to tert.-butyl inclusive as defined above, and the like, especially $C_{1-3}$ or $C_{1-2}$ alkyl;

straight and branched chain lower alkoxy of 1–4 carbon atoms such as methoxy, ethoxy, n- and iso-propoxy, n-, iso-, sec.- and tert.-butoxy, and the like, especially $C_{1-3}$ or $C_{1-2}$ alkoxy; or phenyl;

X represents oxygen; or
sulfur;

$R^2$ represents chloro;

straight and branched chain lower alkyl hydrocarbon of 1–4 carbon atoms such as methyl to tert.-butyl inclusive as defined above, and the like, especially $C_{1-3}$ or $C_{1-2}$ alkyl; or straight and branched chain lower alkoxy of 1–4 carbon atoms such as methoxy to tert.-butoxy, as defined above, and the like, especially $C_{1-3}$ or $C_{1-2}$ alkoxy; and $n$ represents a whole number from 1 to 2.

Preferably, R is $C_{1-4}$ or $C_{1-3}$ or $C_{1-2}$ alkyl; $R^1$ is $C_{1-4}$ or $C_{1-3}$ or $C_{1-2}$ alkyl; or $C_{1-4}$ or $C_{1-3}$ or $C_{1-2}$ alkoxy; or phenyl; X is oxygen; or sulfur; $R_2$ is chloro; or $C_{1-2}$ alkyl; or $C_{1-2}$ alkoxy; and $n$ is 1 or 2.

In particular, R is $C_{1-3}$ alkyl; $R^1$ is $C_{1-3}$ alkyl; or $C_{1-3}$ alkoxy; or phenyl; X is oxygen; or sulfur; and $R^2$ is chloro when $n$ is 1; methyl when $n$ is 1 or 2; and methoxy when $n$ is 1.

The starting phosphoric, phosphonic, thionophosphoric and thionophosphonic acid ester halides of Formula III are known and readily available on an industrial scale.

The substituted 3-hydroxy-benzo-1,2,4-triazines required as starting materials for the carrying out of the instant production process are, in part, known from the literature. There have proved suitable, inter alia, the following compounds:

| | M.P. (° C.) |
|---|---|
| 3-hydroxy-5-methyl-benzo-1,2,4-triazine | 186 |
| 3-hydroxy-7-methyl-benzo-1,2,4-triazine | 187 |
| 3-hydroxy-5,7-dimethyl-benzo-1,2,4-triazine | 219 |
| 3-hydroxy-6-methoxy-benzo-1,2,4-triazine | 181 |
| 3-hydroxy-7-methoxy-benzo-1,2,4-triazine | 184 |
| 3-hydroxy-7-chloro-benzo-1,2,4-triazine | 210 |

The production process according to the present invention is preferably carried out with the use of suitable solvents (which terms includes more diluents). As such, practically all inert organic solvents or mixtures thereof are suitable, such as hydrocarbons, for example benzine, benzene, toluene, chlorobenzene, xylene; ethers, for example diethyl or dibutyl ether, dioxan; further, ketones, for example acetone, methylethyl, methylisopropyl and methylisobutyl ketone; and the like. For the desired purpose, however, particularly good results have been obtained with low-boiling aliphatic alcohols, for example methanol, ethanol as well as, above all, nitriles, for example aceto- and propionitrile; further, dimethyl formamide; and the like.

Moreover, the reaction according to the instant production process is preferably carried out in the presence of acid acceptors. For this purpose, practically all customary acid-binding agents can be used. Particularly suitable have proved to be alkali metal alcoholates and carbonates, such as potassium and sodium methylate or ethylate, sodium and potassium carbonate; further, tertiary aliphatic, aromatic or heterocyclic amines, for example triethylamine, dimethylaniline or pyridine, and the like.

The reaction temperatuure can be varied within a fairly wide range. In general, the reaction is carried out at substantially between about 20–120° C. or the boiling point of the mixture, whichever is the lower, and preferably at between about 40–80° C. or the boiling point of the mixture whichever is the lower.

The starting materials to be reacted according to the production process, and the acid-binding agents to be employed, are, in general, used in stoichiometric amounts. After combining the starting components it is advantageous, in order to complete the reaction, to continue heating the mixture for a period (generally between about ½ and 4 hours), possibly with stirring. Utilizing this method, the instant active compounds are obtained in outstanding yields as well as in excellent purity.

The instant active compounds which can be prepared according to the reaction scheme stated above are obtained in the form of crystallizable oils, which in turn can be obtained in pure form by recrystallization from ethanol. In most cases, however, the purity of the crude products suffices for practical application.

Advantageously, as aforesaid, the instant new compounds are distinguished by an outstanding insecticidal and acaricidal effectiveness, with only slight phytotoxicity. The effect sets in rapidly and is long-lasting. The active compounds according to the present invention can be used with marked success for the control of noxious sucking and biting insects and Diptera, as well as against mites (Acarina), particularly in crop protection.

To the sucking insects contemplated herein there belong, in the main, aphids (Aphidae), such as the green peach aphid (*Myzus persicae*), the bean aphid (*Doralis fabae*); scales, such as *Aspidiotus hederae, Lecanium hesperidum, Pseudococcus maritimus;* Thysanoptera, such as *Hercinothrips femoralis;* and bugs, such as the beet bug (*Piesma quadrata*) and the bed bug (*Cimex lectularius*); and the like.

To be classed with the biting insects contemplated herein are butterfly caterpillars, such as *Plutella maculipennis, Lymantria dispar;* beetles (Coleoptera), for example the granary weevil (*Sitophilus granarius=Calandra granaria*), the Colorado beetle (*Leptinoatarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (Bruchidius=*Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Laucophaea* or *Rhyparobia madeirae*). Oriental cockroach (*Blatta orientalis*), the giant cockroach (*Blaberus giganteus*) and the black giant cockroach (*Blaberus fuscus*) as well as *Henschoutedenia flexi-*

*vitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such the yellow fever mosquito (*Aedes aegypti*), the northern house mosquito (*Culex pipiens*) and the malaria mosquito (*Anopheles stephensi*); and the like. Also included in this regard are blowflies such as *Lucilia sericata* and *Chrysoma chloropyga*; and the like.

With the mites (Acari) contemplated herein there are classed, in particular, the spider mites (Tetranychidae) such as the two-spotted spider mite (*Tetranychus telaris=Tetranychus althaeae* or *Tetranychus urticae*) and the European red mite (*Paratetranychus pilosus=Panonychus ulmi*), gall mites, for example the current gall mite (*Eriphyes ribis*) and tarsonemids, for example the broad mite (*Hemitarsonemus latus*) and the cyclamen mite (*Tarsonemus pallidus*); finally ticks, such as the relapsing fever tick (*Ornithodorus moubata*) and *Boophilus microplus*; and the like.

Significantly, when used against household pests and pests of stored products, particularly flies and mosquitoes, the instant active compounds are also distinguished by an outstanding residual activity on wood and clay, and a good stability to alkali on limed substrates.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal formulations or compositions, e.g. conventional pesticidal dispersible carrier vehicles such as solutions, emulsions, suspensions, emulsifiable concentrates, spray powder pastes, soluble powders, dusting agents, granules, etc. There are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanol-amine, etc.), ethers, ether-alcohols (e.g. glycol mono-methyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, herbicides, bactericides, etc., if desired, or in the form of particular dosage preparations for specific application made therefrom, such as solutions, emulsions, suspensions, powders, paste, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and more particularly methods of combating at least one of insects and acarids which comprise applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1
Plutella test

Solvent: 3 parts by weight acetone
Emulsifier: 1 part by weight alkylarylpolyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage. 100% means that all the caterpillars are killed, whereas 0% means that none of the caterpillars are killed.

The particular active compounds tested, their concentrations, the evaluation time and the results can be seen from the following Table 1:

TABLE 1.—PLUTELLA TEST

| Active compound (constitution) | Concentration of active compound in percent | Degree of destruction in percent after 3 days |
|---|---|---|
| (A) $(CH_3O)_2\overset{S}{\underset{\|}{P}}-O-$ [quinoxaline]$-CH_3$ (Comparative preparation known from Belgian Patent 702,672). | 0.01 | 30 |
| (B) $(C_2H_5O)_2\overset{S}{\underset{\|}{P}}-O-$ [quinoxaline]$-Cl$ (Comparative preparation known from Belgian Patent 702,672) | 0.01<br>0.001 | 100<br>0 |
| $(1_1)$ $\overset{CH_3}{\underset{C_2H_5O}{\diagdown}}\overset{S}{\underset{\|}{P}}-O-$ [benzotriazine with $CH_3$] | 0.01<br>0.001 | 100<br>100 |
| $(2_1)$ $(C_2H_5O)_2\overset{S}{\underset{\|}{P}}-O-$ [benzotriazine]$-CH_3$ | 0.01<br>0.001 | 100<br>100 |
| $(3_1)$ $(C_2H_5O)_2\overset{S}{\underset{\|}{P}}-O-$ [benzotriazine with $CH_3$ and $CH_3$] | 0.01<br>0.001 | 100<br>100 |
| $(4_1)$ $(i\text{-}C_3H_7O)_2\overset{S}{\underset{\|}{P}}-O-$ [benzotriazine with $CH_3$] | 0.01<br>0.001 | 100<br>100 |
| $(5_1)$ $\overset{CH_3}{\underset{C_2H_5O}{\diagdown}}\overset{S}{\underset{\|}{P}}-O-$ [benzotriazine with $CH_3$ and $CH_3$] | 0.01<br>0.001 | 100<br>100 |
| $(6_1)$ $\overset{C_2H_5}{\underset{C_2H_5O}{\diagdown}}\overset{S}{\underset{\|}{P}}-O-$ [benzotriazine with $CH_3$ and $CH_3$] | 0.01<br>0.001 | 100<br>100 |
| $(7_1)$ $(C_2H_5O)_2\overset{S}{\underset{\|}{P}}-O-$ [benzotriazine]$-OCH_3$ | 0.01<br>0.001 | 100<br>100 |

TABLE 1.—PLUTELLA TEST—Continued

| Active compound (constitution) | Concentration of active compound in percent | Degree of destruction in percent after 3 day |
|---|---|---|
| (8₁) CH₃–P(=S)(OC₂H₅)–O–[1,2,3-benzotriazine]–OCH₃ | 0.01<br>0.001<br>0.0001 | 100<br>100<br>100 |
| (9₁) C₂H₅–P(=S)(OC₂H₅)–O–[1,2,3-benzotriazine]–OCH₃ | 0.01<br>0.001<br>0.0001 | 100<br>100<br>85 |

EXAMPLE 2

Myzus test (contact action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage plants (*Brassica oleracea*) which have been heavily infested with peach aphids (*Myzus persicae*) are sprayed with the preparation of the given acive compound until dripping wet.

After the specified period of time, the degree of destruction is determined as a percentage: 100% means that all the aphids are killed, whereas 0% means that none of the aphids are killed.

The particular active compounds tested, their concentrations, the evaluation time and the results obtained can be seen from the following Table 2.

TABLE 2.—MYZUS TEST

| Active compound (constitution) | Concentration of active compound in percent | Degree of destruction in percent after 24 hours |
|---|---|---|
| (C) C₂H₅O–P(=S)(C₆H₅)–O–[quinazoline]–(CH₃)₂<br>(5,7- or 6,8-)<br>(Comparative preparation known from Belgian Patent 702,672) | 0.1 | 40 |
| (10₁) (i-C₃H₇O)₂P(=O)–O–[benzotriazine]–CH₃ | 0.1<br>0.01<br>0.001 | 100<br>100<br>99 |
| (11₁) (C₂H₅O)₂P(=S)–O–[benzotriazine]–CH₃ | 0.1<br>0.01<br>0.001 | 100<br>100<br>80 |
| (12₁) C₂H₅–P(=S)(OC₂H₅)–O–[benzotriazine]–CH₃ | 0.1<br>0.01<br>0.001<br>0.0001 | 100<br>100<br>100<br>75 |
| (13₁) C₂H₅–P(=S)(OC₂H₅)–O–[benzotriazine]–CH₃ | 0.1<br>0.01 | 100<br>100 |
| (14₁) (C₂H₅O)₂P(=O)–O–[benzotriazine with CH₃ groups] | 0.1<br>0.01<br>0.001 | 100<br>100<br>90 |

TABLE 2.—MYZUS TEST—Continued

| Active compound (constitution) | Concentration of active compound in percent | Degree of destruction in percent after 24 hours |
|---|---|---|
| (15₁) 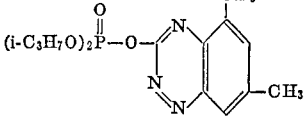 | 0.1<br>0.01<br>0.001 | 100<br>100<br>98 |
| (16₁) 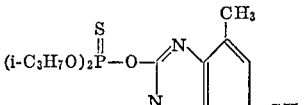 | 0.1<br>0.01 | 99<br>55 |
| (17₁) 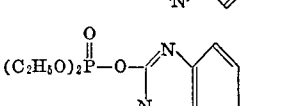 | 0.1<br>0.01 | 100<br>99 |
| (18₁) 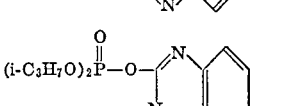 | 0.1<br>0.01 | 100<br>100 |
| (19₁) 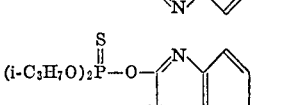 | 0.1<br>0.01 | 99<br>75 |

EXAMPLE 3

Tetranychus test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the preparation of the given active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 3:

TABLE 3.—TETRANYCHUS TEST

| Active compound (constitution) | Concentration of active compound in percent | Degree of destruction in percent after 24 days |
|---|---|---|
| (D) 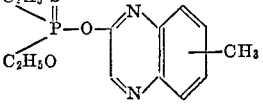<br>(6- or 7-)<br>(Comparative preparation known from Belgian Patent 702,672) | 0.1 | 20 |
| (E) 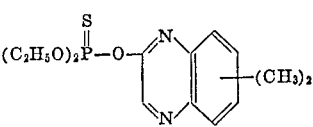<br>(5,7- or 6,8-)<br>(Comparative preparation known from Belgian Patent 702,672) | 0.1 | 0 |

TABLE 3—Continued

| Active compound (constitution) | Concentration of active compound in percent | Degree of destruction in percent after 24 days |
|---|---|---|
| (F) 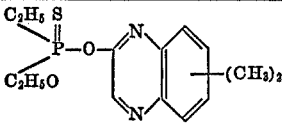 (5,7- or 6,8-) (Comparative preparation known from Belgian Patent 702,672) | 0.1 | 20 |
| (11₃) 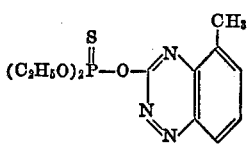 | 0.1<br>0.01 | 100<br>99 |
| (1₂) 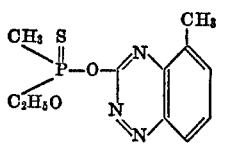 | 0.1<br>0.01 | 100<br>99 |
| (21₂) 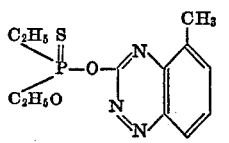 | 0.1<br>0.01 | 100<br>95 |
| (14₂) 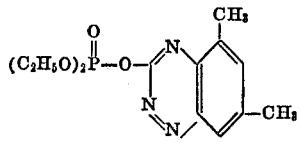 | 0.1 | 100 |
| (17₂) 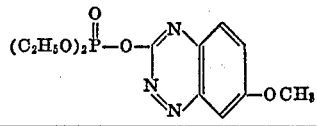 | 0.1 | 100 |

EXAMPLE 4

Mosquito larvae test

Test insects: *Aedes aegypti* (5th larval stage)
Solvent: 99 parts by weight acetone
Emulsifier: 1 part by weight benzylhydroxy diphenyl-polyglycol ether To produce a suitable preparation of the particular active compound, 2 parts by weight of such active compound are dissolved in 1000 parts by volume of the stated solvent containing the stated amount of emulsifier, and the resulting solution is diluted with water to the desired final concentration.

The aqueous preparations of the given active compound are placed in glass vessels and about 25 mosquito larvae are then placed in each glass vessel.

After 24 hours, the degree of destruction is determined as a percentage. 100% means that all the larvae are killed, whereas 0% means that none of the larvae are killed.

The particular active compounds tested, their concentrations, the test insects and the results obtained can be seen from the following Table 4:

TABLE 4.—MOSQUITO LARVAE TEST

| Active compound (constitution) | Concentration of active compound of the solution in p.p.m. | Degree of destruction in percent |
|---|---|---|
| (20₁) 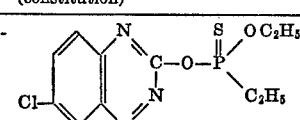 | 1 | 100 |
| (21₁) 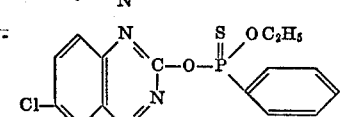 | 10<br>1 | 100<br>90 |

TABLE 4—Continued

| Active compound (constitution) | Concentration of active compound of the solution in p.p.m. | Degree of destruction in percent |
|---|---|---|
| (13₂) benzotriazine with S, OC₂H₅, C₂H₅, 6-CH₃ | 1 | 100 |
| (2₂) benzotriazine with S, P(OC₂H₅)₂, 6-CH₃ | 10<br>1 | 100<br>80 |
| (6₂) benzotriazine with S, OC₂H₅, C₂H₅, 5-CH₃, 7-CH₃ | 0.1<br>0.01 | 100<br>70 |
| (3₂) benzotriazine with S, P(OC₂H₅)₂, 5-CH₃, 7-CH₃ | 1<br>0.1 | 100<br>60 |
| (14₃) benzotriazine with O, P(OC₂H₅)₂, 5-CH₃, 7-CH₃ | 1 | 100 |
| (5₂) benzotriazine with S, CH₃, OC₂H₅, 5-CH₃, 7-CH₃ | 0.1 | 100 |
| (9₂) benzotriazine with S, OC₂H₅, C₂H₅, 7-CH₃O | 1 | 100 |
| (17₃) benzotriazine with O, (OC₂H₅)₂, 7-CH₃O | 1 | 100 |
| (8₂) benzotriazine with S, CH₃, OC₂H₅, 7-CH₃O | 1<br>0.1 | 100<br>40 |
| (7₂) benzotriazine with S, (OC₂H₅)₂, 7-CH₃O | 1 | 100 |
| (22₁) benzotriazine with S, phenyl, OC₂H₅, 7-CH₃O | 1<br>0.1 | 100<br>30 |

TABLE 4—Continued

| Active compound (constitution) | Concentration of active compound of the solution in p.p.m. | Degree of destruction in percent |
|---|---|---|
| (11₃) 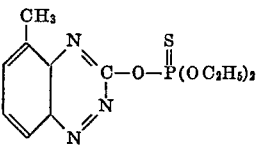 | 0.1 | 100 |
| (23₃) 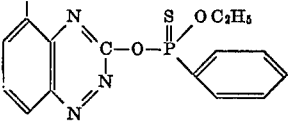 | 1 | 100 |
| (1₃) 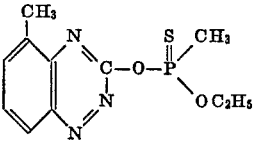 | 1<br>0.1 | 100<br>90 |
| (4₂) 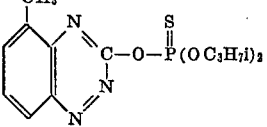 | 0.1 | 100 |
| (10)₂ 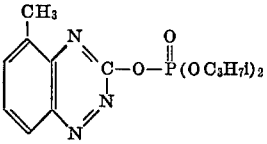 | 1 | 100 |

The following further examples illustrate, without limitation, the process for producing the particular new compounds of the present invention.

EXAMPLE 5

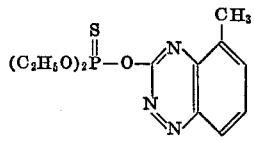

(11₄)

48 g. (0.3 mol) of 3-hydroxy-5-methyl-benzo-1,2,4-triazine and 45 g. of dry, finely powdered potassium carbonate are stirred in 400 ml. acetonitrile for 30 minutes at 80° C. 57 g. O,O-diethyl-thiono-phosphoric acid ester chloride are then added dropwise to the mixture at 70° C., the latter is stirred for a further 3 to 4 hours at 80° C., then cooled, and 500 ml. benzene are added thereto. The benzene solution is washed with water, then with 1 N solution of potassium hydroxide, and finally again with water. Thereafter, the solution is dried over sodium sulfate and evaporated under reduced pressure, finally at 60 to 70° C., and 0.01 mm. Hg. There are thus obtained 78 g. (83% of the theory) of yellow crystals of O,O-diethyl-O-(5-methylbenzo-1,2,4-triazin-3-yl)-thiono-phosphoric acid ester, which can be recrystallized from ethanol and which melt at 45° C.

Analysis.—Calculated for $C_{12}H_{16}N_3O_3PS$ (molecular weight 313.3) (percent): P, 9.89; S, 10.23. Found (percent): P, 9.89; S, 10.19.

EXAMPLE 6

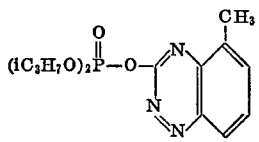

(10₂)

48 g. (0.03 mol) 3-hydroxy-5-methyl-benzo-1,2,4-triazine are stirred in 250 ml. dimethyl formamide, and a methanolic solution of 0.3 mol sodium methylate is then added. The solvent is distilled off, first at 10 mm. Hg, and then at 0.1 to 0.01 mm. Hg. The resulting dry sodium salt of the hydroxytriazine is suspended in 300 ml. methylethyl ketone, and 61 g. O,O-diisopropyl-phosphoric acid ester chloride are added dropwise to this suspension at 70 to 80° C. After stirring for a further 2 hours at 70 to 80° C., the solvent is distilled off under reduced pressure, the residue is taken up in benzene and the further procedure according to Example 5 is followed. After recrystallization, 40 g. O,O-diisopropyl-O-(5-methyl-benzo-1,2,4-triazin-3-yl)-phosphoric acid ester of melting point 55° C. are obtained.

Analysis.—Calculated for $C_{14}H_{20}N_3O_4P$ (molecular weight 325.3) (percent): N, 12.92; P, 9.52. Found (percent): N, 12.75; P, 9.49.

The compounds of the general Formula I which are tabulated in the following Table 5 can also be prepared in analogous manner as described in Examples 5 and 6.

TABLE 5

| R | R¹ | X | R² | n | Yield (percent of the theory) | M.P. (° C.) | Calculated Cl | N | P | S | Found Cl | N | P | S |
|---|---|---|---|---|---|---|---|---|---|---|---|---|---|---|
| (4₃) —C₃H₇-i | —OC₃H₇-i | S | 5-CH₃ | 1 | 46 | 64 | | 12.31 | 9.07 | 9.39 | | 12.67 | 9.15 | 9.27 |
| (1₄) —C₂H₅ | —CH₃ | S | 5-CH₃ | 1 | 44 | 115 | | 14.83 | 10.94 | 11.32 | | 15.14 | 10.83 | 11.39 |
| (12₃) —C₂H₅ | —C₂H₅ | S | 5-CH₃ | 1 | 81 | 48 | | 14.13 | 10.44 | | | 13.90 | 10.34 | |
| (23₂) —C₂H₅ | ⟨phenyl⟩ | S | 5-CH₃ | 1 | 56 | 82 | | 12.17 | 8.97 | 9.28 | | 11.73 | 9.05 | 9.46 |
| (2₅) —C₂H₅ | —OC₂H₅ | S | 7-CH₃ | 1 | 25 | 52 | | 13.41 | 9.89 | 10.23 | | 12.85 | 10.08 | 10.32 |
| (24₁) —C₃H₇-i | —OC₃H₇-i | S | 7-CH₃ | 1 | 42 | 106 | | 12.31 | 9.07 | 9.39 | | 12.30 | 9.71 | 9.59 |
| (13₃) —C₂H₅ | —C₂H₅ | S | 7-CH₃ | 1 | 51 | 42 | | 14.13 | 10.42 | 10.79 | | 14.06 | 10.69 | 10.78 |
| (25₁) —C₂H₅ | ⟨phenyl⟩ | S | 7-CH₃ | 1 | 58 | 152 | | 12.17 | 8.97 | 9.28 | | 12.46 | 9.14 | 9.59 |
| (14₄) —C₂H₅ | —OC₂H₅ | O | 5-CH₃, 7-CH₃ | 2 | 22 | 68 | | 13.50 | 9.95 | | | 13.90 | 10.05 | |
| (3₅) —C₂H₅ | —OC₂H₅ | S | 5-CH₃, 7-CH₃ | 2 | 46 | 68 | | 12.84 | 4.46 | 9.80 | | 12.99 | 9.41 | 9.66 |
| (15₂) —C₃H₇-i | —OC₃H₇-i | O | 5-CH₃, 7-CH₃ | 2 | 16 | 75 | | 12.39 | 9.12 | | | 11.78 | 9.29 | |
| (16₂) —C₃H₇-i | —OC₃H₇-i | S | 5-CH₃, 7-CH₃ | 2 | 44 | 89 | | 11.82 | 8.71 | 9.02 | | 11.61 | 8.73 | 8.86 |
| (5₃) —C₂H₅ | —CH₃ | S | 5-CH₃, 7-CH₃ | 2 | 51 | 82 | | 14.13 | 10.42 | 10.97 | | 14.35 | 10.34 | 10.86 |
| (6₃) —C₂H₅ | —C₂H₅ | S | 5-CH₃, 7-CH₃ | 2 | 24 | 69 | | | 9.95 | 10.30 | | | 10.13 | 10.34 |
| (26₁) —C₂H₅ | ⟨phenyl⟩ | S | 5-CH₃, 7-CH₃ | 2 | 42 | 97 | | 11.69 | 8.61 | 8.92 | | 11.26 | 7.95 | 8.71 |
| (17₄) —C₂H₅ | —OC₂H₅ | O | 7-OCH₃ | 1 | 65 | 70 | | 13.42 | 9.89 | | | 12.82 | 9.76 | |
| (7₃) —C₂H₅ | —OC₂H₅ | S | 7-OCH₃ | 1 | 36 | 57 | | | 9.40 | 9.74 | | | 9.25 | 9.52 |
| (18₂) —C₃H₇-i | —OC₃H₇-i | O | 7-OCH₃ | 1 | 50 | 69 | | | 9.07 | | | | 9.02 | |
| (19₂) —C₃H₇-i | —OC₃H₇-i | S | 7-OCH₃ | 1 | 29 | 73 | | | 8.66 | 8.97 | | | 8.68 | 8.68 |
| (8₃) —C₂H₅ | —CH₃ | S | 7-OCH₃ | 1 | 76 | 97 | | | 10.35 | 10.71 | | | 10.44 | 10.56 |
| (9₃) —C₂H₅ | —C₂H₅ | S | 7-OCH₃ | 1 | 89 | 77 | | 13.41 | 9.89 | 10.23 | | 13.93 | 10.27 | 10.24 |
| (22₁) —C₂H₅ | ⟨phenyl⟩ | S | 7-OCH₃ | 1 | 42 | 101 | | 11.63 | 8.57 | 8.87 | | 11.77 | 8.55 | 8.57 |
| (27₁) —C₂H₅ | —OC₂H₅ | O | 7-Cl | 1 | 37 | 105 | 11.16 | 13.23 | 9.75 | | 11.04 | 13.11 | 9.89 | |
| (28₁) —C₂H₅ | —OC₂H₅ | S | 7-Cl | 1 | 29 | 53 | 10.63 | 12.59 | 9.25 | 9.61 | 10.62 | 12.50 | 10.06 | 10.13 |
| (29₁) —C₃H₇-i | —OC₃H₇-i | S | 7-Cl | 1 | 65 | 72 | 9.80 | 11.62 | 8.56 | | 9.87 | 10.85 | 8.34 | |
| (30₁) —C₂H₅ | —CH₃ | S | 7-Cl | 1 | 40 | 144 | 11.67 | 13.83 | 10.17 | 10.56 | 12.04 | 13.94 | 9.97 | 10.39 |
| (20₂) —C₂H₅ | —C₂H₅ | S | 7-Cl | 1 | 47 | 70 | 11.16 | 13.24 | 9.75 | 10.09 | 11.21 | 12.79 | 10.07 | 10.19 |
| (21₂) —C₂H₅ | —C₆H₅ | S | 7-Cl | 1 | 34 | 74 | 9.69 | 11.49 | 8.46 | 8.77 | 9.88 | 11.61 | 8.43 | 8.88 |

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Phosphorus acid ester of the formula

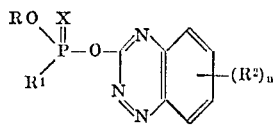

in which R is alkyl of 1–4 carbon atoms, R¹ is selected from the group consisting of alkyl of 1–4 carbon atoms, alkoxy of 1–4 carbon atoms and phenyl, X is selected from the group consisting of oxygen and sulfur, R² is selected from the group consisting of chloro, alkyl of 1–4 carbon atoms and alkoxy of 1–4 carbon atoms, and $n$ is a whole number from 1 to 2.

2. Compound according to claim 1 wherein R is alkyl of 1–3 carbon atoms, R¹ is selected from the group consisting of alkyl of 1–3 carbon atoms, alkoxy of 1–3 carbon atoms and phenyl, X is selected from the group consisting of oxygen and sulfur, R² is selected from the group consisting of chloro, $C_{1-2}$ alkyl and $C_{1-2}$ alkoxy, and $n$ is 1–2.

3. Compound according to claim 1 wherein R is alkyl of 1–3 carbon atoms, R¹ is selected from the group consisting of alkyl of 1–3 carbon atoms, alkoxy of 1–3 carbon atoms and phenyl, X is selected from the group consisting of oxygen and sulfur, R² is selected from the group consisting of chloro, methyl and methoxy, and $n$ is 1–2, with the proviso that $n$ is 1 when R² is selected from the group consisting of chloro and methoxy, whereas $n$ is 2 when R² is methyl.

4. Compound according to claim 1 wherein such compound is methyl-O-ethyl-O-(5-methyl-benzo-1,2,4-triazin-3-yl)-thiono-phosphonic acid ester of the formula

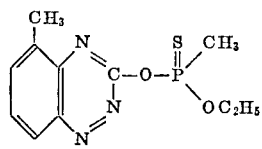

5. Compound according to claim 1 wherein such compound is O,O - diethyl - O-(7-methyl-benzo-1,2,4-triazin-3-yl)-thionophosphoric acid ester of the formula

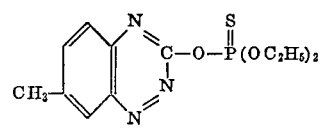

6. Compound according to claim 1 wherein such compound is methyl-O-ethyl-O-(5,7-dimethyl-benzo-1,2,4-triazin-3-yl)-thiono-phosphonic acid ester of the formula

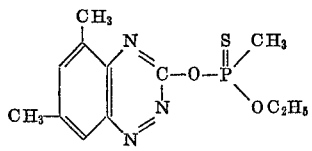

7. Compound according to claim 1 wherein such compound O,O - diethyl - O - (5,7-dimethyl-benzo-1,2,4-triazin-3-yl)-phosphoric acid ester of the formula

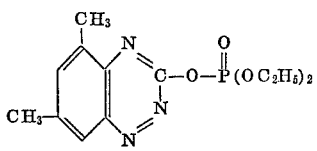

8. Compound according to claim 1 wherein such compound is O,O-diethyl-O-(7-methoxy-benzo-1,2,4-triazin-3-yl)-phosphoric acid ester of the formula

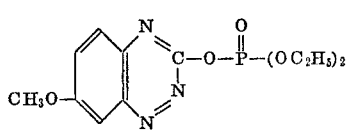

9. Compound according to claim 1 wherein such compound is ethyl-O-ethyl-O-(7-chloro-benzo-1,2,4-triazin-3-yl)-thionophosphonic acid ester of the formula

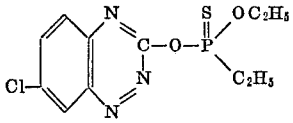

10. Compound according to claim 1 wherein such compound is phenyl-O-ethyl-O-(7-methoxy-benzo-1,2,4-triazin-3-yl)-thiono-phosphonic acid ester of the formula

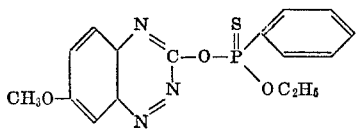

References Cited

UNITED STATES PATENTS

| | | |
|---|---|---|
| 3,510,484 | 5/1970 | Schmidt et al. _____ 260—248 |
| 3,349,088 | 10/1967 | Molnar et al. _____ 260—248 |
| 2,489,358 | 11/1949 | Wolf et al. _____ 260—248 |

OTHER REFERENCES

Jiu et al.: J. Org. Chem., vol. 24, pp. 813–8 (1959).

JOHN M. FORD, Primary Examiner

U.S. Cl. X.R.

424—249

UNITED STATES PATENT OFFICE
CERTIFICATE OF CORRECTION

Patent No. 3,657,234      Dated April 18, 1972

Inventor(s) KARL-JULIUS SCHMIDT and INGEBORG HAMMANN

It is certified that error appears in the above-identified patent and that said Letters Patent are hereby corrected as shown below:

Col. 3, line 68, "more" should be --mere--.

Col. 8, Table 1, letter (A), "(CH$_3$O) should be --(CH$_3$O)$_2$--.

Cols. 15 and 17, Table 4, correct the structural formulas ($8_2$), ($7_2$), ($22_1$) and ($11_3$) as follows:

($8_2$) 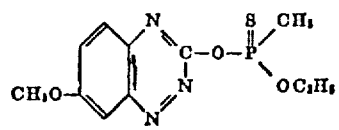

($22_1$) 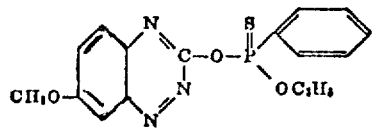

Col. 17, Table 4, "($23_3$)" should be --($23_1$)--.

Signed and sealed this 10th day of April 1973.

(SEAL)
Attest:

EDWARD M. FLETCHER, JR.
Attesting Officer

ROBERT GOTTSCHALK
Commissioner of Patents